United States Patent [19]

Waters

[11] Patent Number: 4,848,626
[45] Date of Patent: Jul. 18, 1989

[54] UTILITY BOX

[75] Inventor: John E. Waters, Waco, Tex.

[73] Assignee: Durakon Industries, Inc., Lapeer, Mich.

[21] Appl. No.: 154,706

[22] Filed: Feb. 11, 1988

[51] Int. Cl.⁴ .............................................. B60R 9/00
[52] U.S. Cl. ................................. 224/273; 224/327; 296/37.6; 312/DIG. 33
[58] Field of Search ................. 224/327, 42.42, 273; 220/22.2, 22.3, 22.5; 296/37.6; 312/DIG. 33; 206/349

[56] References Cited

U.S. PATENT DOCUMENTS

| | | | |
|---|---|---|---|
| 2,985,333 | 5/1961 | Kirkman | 220/22.3 |
| 4,436,215 | 3/1984 | Kleinert et al. | 220/22.2 |
| 4,488,669 | 12/1984 | Waters | 224/42.42 |
| 4,499,998 | 2/1985 | Carlson | 220/22.3 |
| 4,728,017 | 3/1988 | Mullican | 296/37.6 |

Primary Examiner—Edward L. Roberts
Attorney, Agent, or Firm—Dykema Gossett

[57] ABSTRACT

A container adapted for use as a tool or utility box which is constructed to provide maximum flexibility in storing articles therein. The body of the container comprises side walls having inwardly directed ribs and ledge portions for slidably supporting a tray assembly. Smaller compartments may be formed within the interior of the container by using specially constructed dividers that cooperate with the inwardly directed ribs. The height of the dividers is less than the length of the side walls so that articles may be supported above the compartments formed by the dividers. Further, the construction of the container walls and tray assembly permits various sizes and types of articles to be stored and segregated within the container.

5 Claims, 2 Drawing Sheets

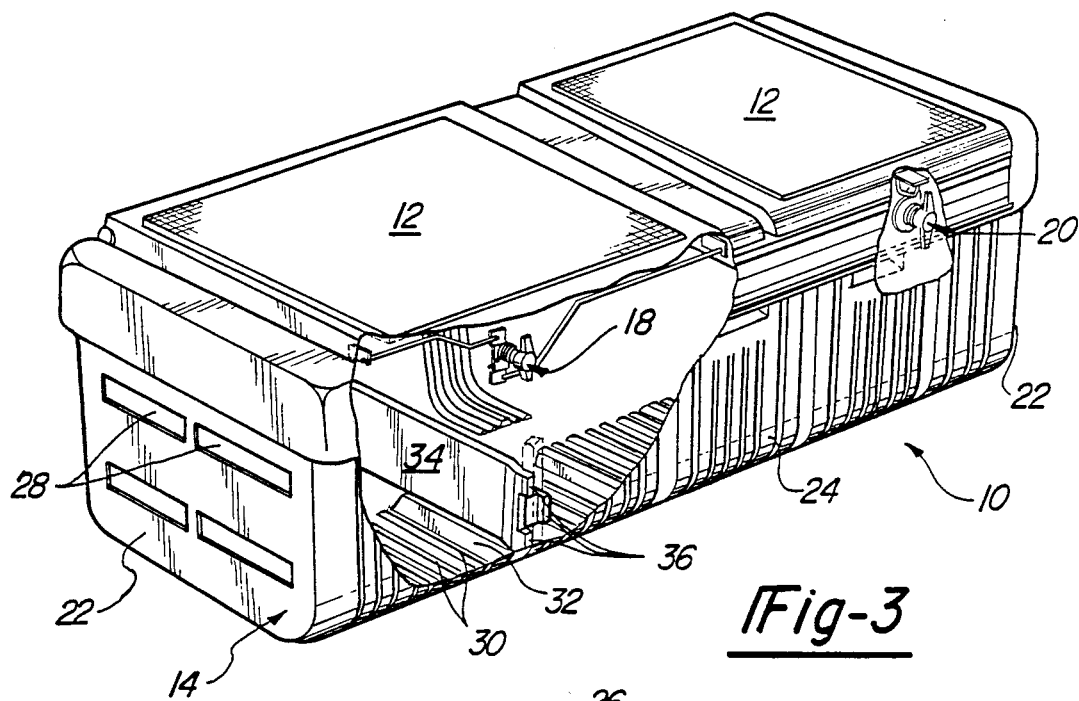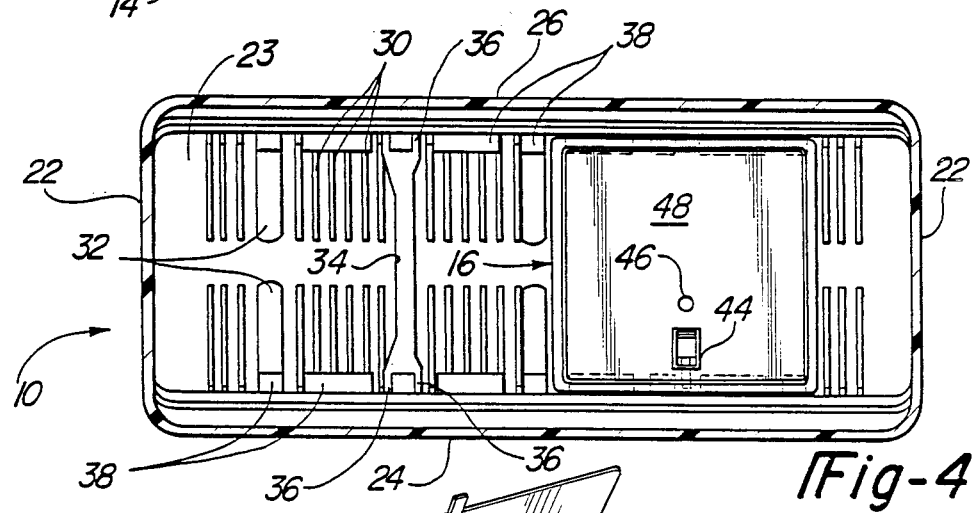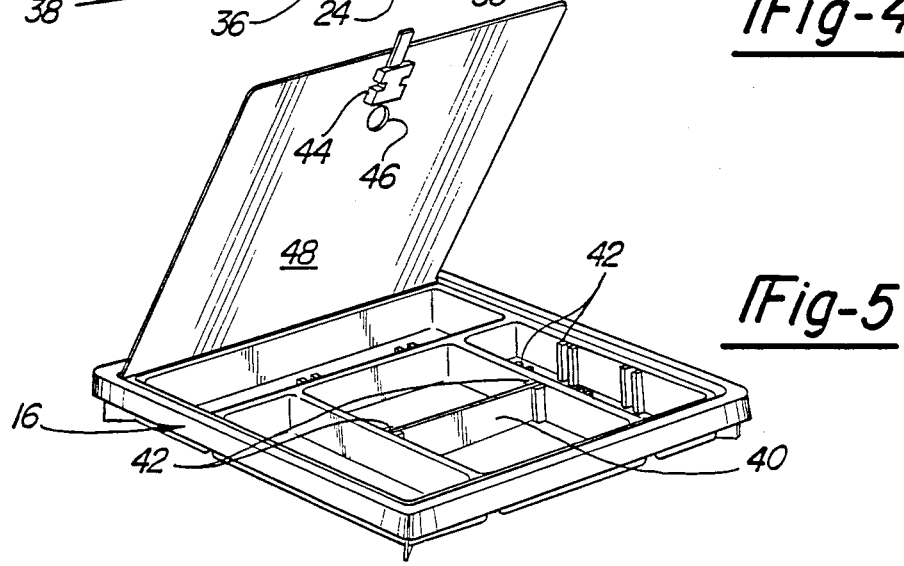

UTILITY BOX

BACKGROUND OF THE INVENTION

The present invention relates to improvements in containers primarily for use as utility boxes for pick-up trucks and the like.

A problem present in pick-up trucks, boats, and the like is that a minimum amount of enclosed space is provided for the protection and storage of tools or other valuable items. To provide for the storage and transportation of items in vehicles such as pick-up trucks, it is common to use tool or utility boxes which fit between the side panels behind the cab. These boxes are commonly made from both metallic and non-metallic materials, however, to avoid corrosion problems, many current tool or utility boxes have been manufactured from non-corrosive thermoplastic polymers such as high-density polyethylene. An example of such a container is set forth in my earlier U.S. Pat. No. 4,488,669.

Even with present utility box constructions, there is a continuing need for a utility box that provides additional flexibility with respect to the types and sizes of articles that may be stored and segregated within the box. Thus, the present invention relates to improvements in containers used as tool or utility boxes wherein more flexibility is provided while retaining the desirable characteristics that the container be strong, lightweight, durable, corrosion resistant, and inexpensive to manufacture.

SUMMARY OF THE INVENTION

The present invention provides an improved tool or utility box which is constructed of non-metallic material such as high-density polyethylene and is adapted to be conveniently constructed in various sizes. The disclosed container permits various sizes and types of articles to be stored and segregated while providing a strong, lightweight, corrosion resistant, and relatively inexpensive construction.

The disclosed container includes front and rear walls having vertical, inwardly directed ribs which are constructed to perform several functions including reinforcement, support and spacing. The ribs extend inwardly along the walls and floor to provide reinforcement to the container and supporting surfaces for articles placed within it. Dividers are provided such that smaller compartments may be formed within the interior of the container along the floor. Each divider includes spaced apart tab elements on its opposite ends which engage the sides of a pair of opposed ribs for both locking the divider and permitting upward and downward sliding movement of the divider along the ribs. The container also includes a pair of sealing lids of different lengths which are pivotally connected to the body of the container to provide access into its interior. Moreover, the container is provided with a tray assembly that is slidably disposed within its body and latch assemblies for selectively locking the lids in a closed position.

The body of the container comprises opposed end walls and a floor integrally formed with the front and rear walls. The end walls preferably includes indentations which may be used for lifting the container. Further, the front and rear walls include a plurality of inwardly directed, spaced, horizontal ledge portions for supporting the tray assembly such that it may be slid to any location along the length of the interior of the container. The ledge portions are formed slightly above the upper vertical extent of the ribs so that the sliding movement of the tray assembly does not necessitate the movement of the dividers.

The tray assembly is compartmentalized for storing smaller articles. Further, it includes movable dividers and a latching mechanism such that the tray assembly may be removed from the container for storage elsewhere.

The interior of the disclosed container is constructed to provide maximum flexibility for storing articles therein. The dividers can be placed at various locations to permit the formation of variably sized compartments along the floor of the container. Further, the height of the dividers is substantially less then the vertical extent of the container walls, and therefore, articles may be laid across and supported by the tops of the dividers within a space extending from the tops of the dividers to the underside of the container lids. The upper portions of the front and rear container walls are spaced apart to a greater extent than the lower portions of the walls to provide a larger front-to-back dimension at the top of the container relative to the bottom. This permits the possibility of storing articles having greater dimensions in the space above the ledge portions. Moreover, the tray assembly and dividers may be removed to allow maximum open storage space within the container. Thus, various sizes and types of articles may be stored and segregated within the container due to the construction disclosed herein.

BRIEF DESCRIPTION OF THE DRAWINGS

FIG. 3 is a perspective view of the utility box with portions cut away to permit viewing of the interior.

FIG. 4 is a cross-sectional view taken along line 4—4 in FIG. 2.

FIG. 5 is a perspective view of the tray assembly which fits within the utility box.

DETAILED DESCRIPTION OF THE INVENTION

Figure 1:
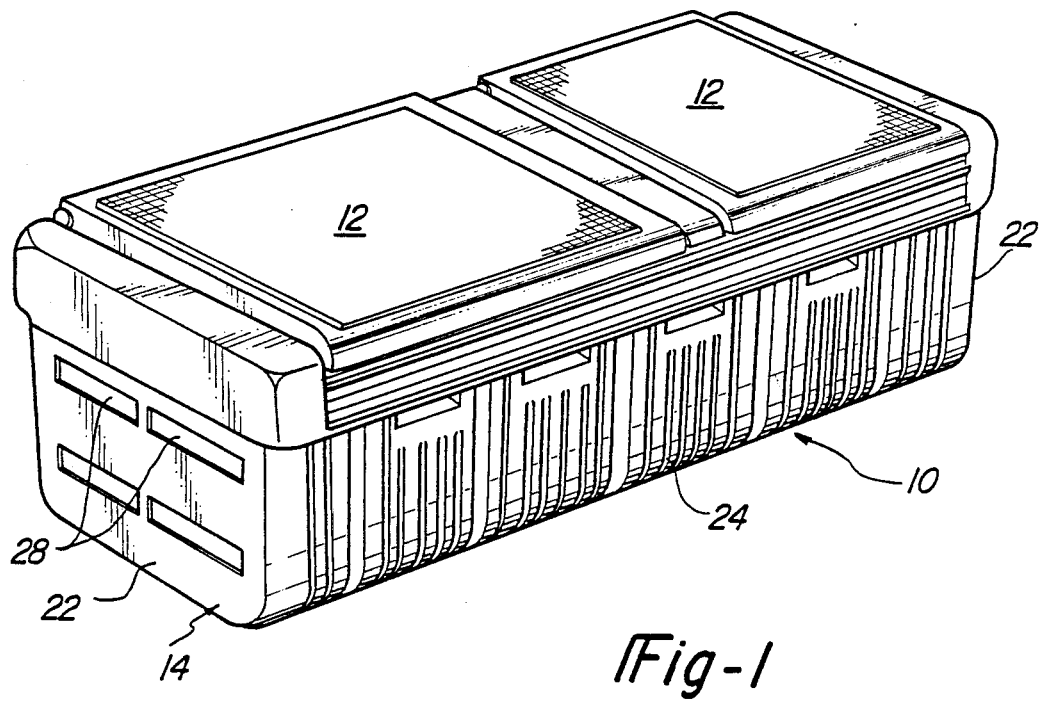
FIG. 1 is a perspective view of the improved utility box of the present invention.

Referring now to the drawings, FIG. 1 depicts a utility box assembly 10 which may be used for carrying tools and the like in the bed of a pick-up truck or for general storage. Box 10 is preferably formed of a non-metallic material such as high density polyethylene to provide an excellent barrier to water vapor and moisture. Box 10 has a pair of sealing lids 12 of different lengths which are pivotally connected to body 14 to provide access into the interior of the box. One of the lids 12 is larger than the other to provide flexibility of use in storing articles. As will be described hereinafter, box 10 is provided with a tray assembly 16 slidably disposed within box 10 and with latch assemblies 18 and 20 for selectively locking lids 12 in a closed position.

Body 14 comprises opposed end walls 22 and floor 23 integrally formed with front and rear walls 24 and 26. End walls 22 preferably include horizontal indentations 28 which may be used for lifting box 10. Front and rear walls 24 and 26 include generally vertical inwardly directed ribs 30 and 32 which are constructed to perform several functions including reinforcement, support and spacing. Ribs 30 and 32 extend inwardly along walls 24 and 26 and floor 23 to provide reinforcement to box 10 and support surfaces for articles placed within it. Ribs 32 also permit the forming of spaced compartments within box 10 as will now be described.

Figure 2:
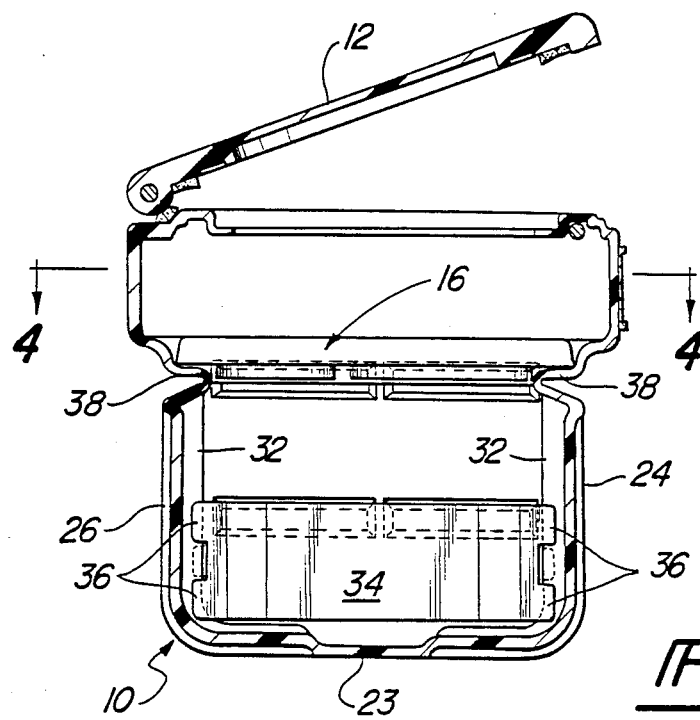
FIG. 2 is a partial cross-section of the utility box.

Dividers 34 are provided within box 10 such that smaller compartments may be formed within the interior of box 10 along floor 23. Spaced apart tab elements 36 are provided on opposite ends of each divider 34 which engage the sides of each respective rib 32 for both locking divider 34 in place and to permit upward and downward sliding movement of divider 34 along the vertical portions of two directly opposite ribs 32. After a divider has been set up in position as shown in FIGS. 2-4, no further locking or adjustment is required.

The front and rear walls 24 and 26 further include a plurality of inwardly directed, spaced, horizontal ledge portions 38 for supporting tray assembly 16 such that it may be slid to any location along the length of the interior of box 10. Further, ledge portions 38 are formed slightly above the upper vertical extent of ribs 32 so that the sliding movement of tray 16 does not required the movement of dividers 34.

As shown in FIG. 5, tray assembly 16 is compartmentalized for storing smaller articles. Further, it includes movable dividers 40 which are removably retained by elements 42. Moreover, tray assembly 16 includes a latch 44 and an opening 46 in its lid 48 such that a finger may be inserted through opening 46 for opening lid 48.

The interior of box 10 is constructed to provide maximum flexibility in storing articles therein. As set forth above, dividers 34 can be placed at various locations to permit the formation of variably sized compartments along the floor 23 of box 10. Dividers 34 can be conveniently set up by simply locating the desired set of opposed ribs 32 and canting divider 34 until the spaced tab elements 36 can be brought into engagement with the opposed sides of each respective rib 32. No further locking is required. Further, since the height of dividers 34 is approximately one-third the vertical extent of walls 22-26, articles may be laid across and supported by the tops of dividers 36 within the space extending from the tops of dividers 34 to the underside of lids 12. As illustrated in FIG. 2, the upper vertical portions of front and rear walls 24 and 26 are spaced apart to a greater extent than the lower portions to provide a larger front-back dimension at the top relative to the bottom. This permits the possibility of storing articles having greater dimensions in the space above ledge portions 38. Moreover, tray assembly 16 and dividers 34 may be removed to allow maximum open storage space within box 10. Thus, various sizes and types of articles may be stored and segregated within box 10 because of the construction disclosed herein.

With the detailed description of the utility box assembly 10 of the present invention, it will be obvious to those skilled in the art that various modifications can be made without departing from the spirit and scope of the present invention which is set forth in the appended claims.

What is claimed is:

1. A container adapted for use as a tool or utility box, said container comprising a molded polymeric body having bottom, side and end wall portions, said side and end wall portions being vertically directed to form an opening into said container for providing access into the interior thereof, lid means pivotally attached to said container and disposed over said opening and latch means for selectively locking said lid means in a closed position, said side walls and bottom including a plurality of inwardly directed ribs, divider means selectively engageable with said ribs such that compartments may be formed within the interior of said container along said bottom, said divider means having opposed end portions which engage said ribs for retaining said divider means and permitting sliding movement of said divider means along said ribs, said ribs having an upper vertical extent along said side walls which is less than the vertical extent of said side walls, and a plurality of inwardly directed, spaced, generally horizontal ledge portions formed above the upper vertical extent of said ribs, and said ledge portions supporting and permitting sliding movement of a tray assembly along the length of the interior of said container; and said divider means includes plural pairs of spaced apart tab elements along each of its opposed ends which engage the sides of a respective rib for selectively retaining said divider means, for permitting upward and downward sliding movement of said divider means along said ribs, and for permitting canting movement of said divider means; and wherein the height of said divider means is substantially less than the vertical extent of said side walls such that articles may be supported by said divider means within the space extending from the divider means to the lid means when said lid means is in said closed position.

2. The container as defined in claim 1 wherein said side walls include upper and lower portions with said ledge portions being between said upper and lower portions, the upper portions of said side walls being spaced apart to a greater extent than the lower portions such that articles having larger dimensions may be stored above said ledge portions and between the upper portions of said side walls.

3. The container as defined in claim 1 wherein said lid means includes two lids, each having a different length to provide flexibility of access into the interior of said container.

4. The container as defined in claim 1 wherein said end walls include generally horizontal inwardly directed indentations to permit lifting of the container.

5. A container adapted for use as a tool or a utility box, said container comprising a molded polymeric body having bottom, side and end wall portions, said side and end wall portions being vertically directed to form an opening into said container for providing access into the interior thereof, lid means pivotally attached to said container and disposed over said opening and latch means for selectively locking said lid means in a closed position, said side walls and bottom including a plurality of inwardly directed ribs, divider means selectively engageable with said ribs such that compartments may be formed within the interior of said container along said bottom, said divider means having opposed end portions which engage said ribs for retaining said divider means and permitting sliding movement of said divider means along said ribs, said ribs having an upper vertical extent along said side walls which is less than the vertical extent of said side walls, and a plurality of inwardly directed, spaced, generally horizontal ledge portions formed above the upper vertical extent of said ribs, a tray assembly, and said ledge portions supporting and permitting sliding movement of said tray assembly along the length of the interior of said container; and said tray assembly includes bottom, side and end walls for forming a body having an opening, a lid pivotally attached to said body and including latch means for selectively locking said lid in a closed position over said opening, said tray assembly including adjustable dividers for compartmentalizing the interior of said tray body, and said lid including an opening therethrough adjacent said latch means to permit easier opening of said lid.

* * * * *